Figure 1:
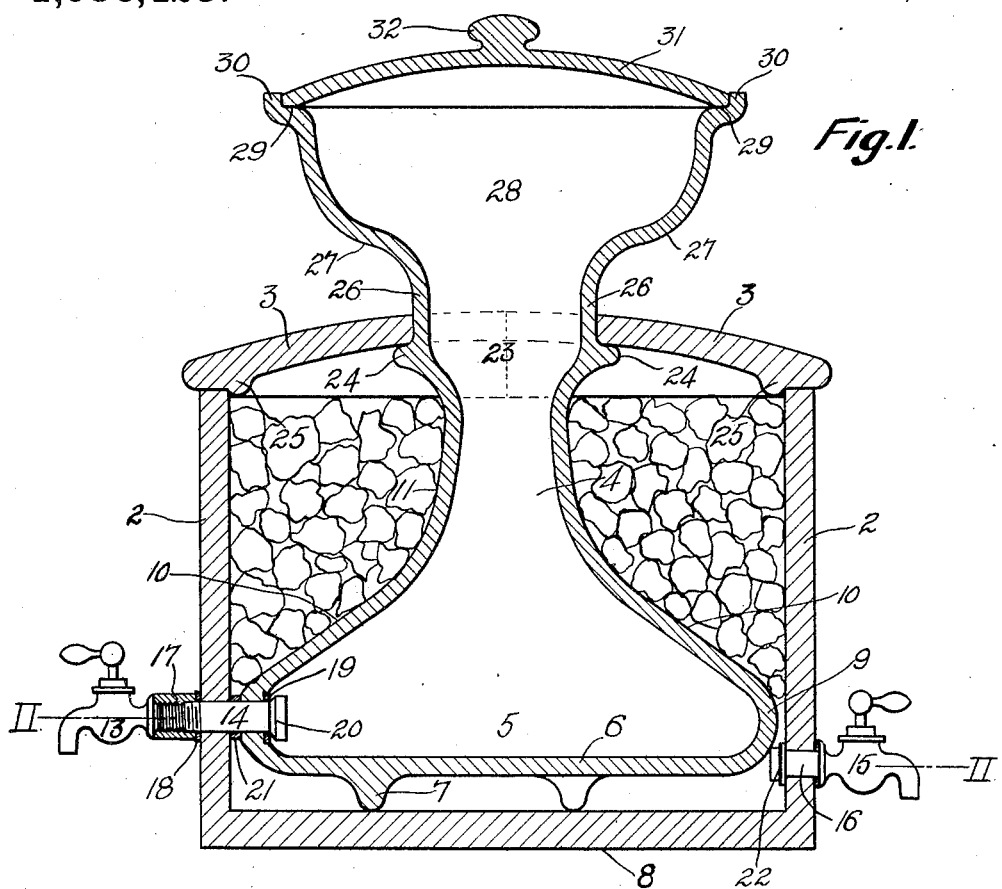

G. VINEY.
FLUID COOLER.
APPLICATION FILED OCT. 24, 1911.

1,086,425.

Patented Feb. 10, 1914.

Witnesses
J. W. Mayfield
W. A. Hickman

Inventor
George Viney
by O. M. Clarke
his attorney

UNITED STATES PATENT OFFICE.

GEORGE VINEY, OF PITTSBURGH, PENNSYLVANIA.

FLUID-COOLER.

1,086,425.

Specification of Letters Patent.

Patented Feb. 10, 1914.

Application filed October 24, 1911. Serial No. 656,449.

*To all whom it may concern:*

Be it known that I, GEORGE VINEY, a citizen of the United States, residing at Pittsburgh, in the county of Allegheny and State of Pennsylvania, have invented certain new and useful Improvements in Fluid-Coolers, of which the following is a specification.

My invention consists of an improvement in cooling vessels for water, milk or other fluid of the class in which the fluid container is inclosed within a surrounding ice-containing vessel, and is adapted to receive and retain a suitable supply of fluid and to expose it to the cooling action of the ice.

The invention has in view to provide a fluid containing vessel adapted to be inserted, as to its lower body portion, within the ice containing vessel and to be inclosed therein by a removable cover or top, the fluid container extending upwardly above the removable top and ice vessel and terminating in an upper bowl section provided with a removable top. The fluid container is also suitably connected through the wall of the ice containing vessel by a delivery faucet for drawing off the contents, while the ice containing vessel is provided with a similar faucet for removal of the melted ice.

The invention relates also to other features of improvement as illustrated in the drawings and specification, and is constructed and adapted to operate in the manner more fully hereinafter set forth.

Figure 2:
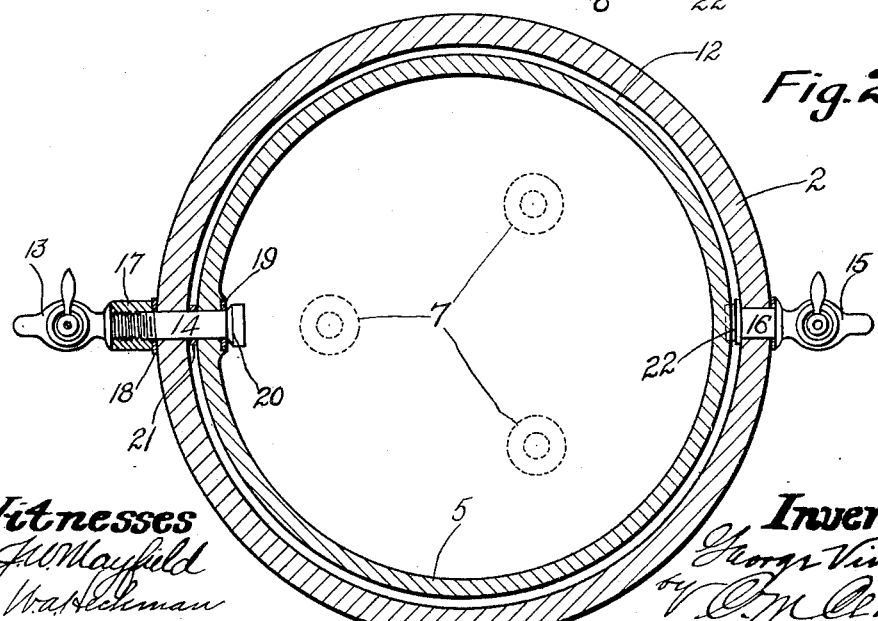

In the drawings: Figure 1 is a view of the entire apparatus in central vertical section. Fig. 2 is a horizontal sectional view on the line II. II. of Fig. 1.

The main outer ice containing vessel 2 is cylindrical in form, provided with a circular two-part top or cover 3 each part having a semi-circular central recess, the vessel 2 being adapted to be mounted by its base on a suitable support as a stand, table, etc. The ice containing vessel 2 is preferably made of a single piece of earthenware, but may be of other material as desired.

The fluid container 4 is provided with a circular base portion 5 of mushroom shape, the bottom 6 of which is provided with a plurality of supporting lugs or projections 7 by which the container is supported on the bottom 8 of the vessel 2. The base portion 5 of the container is particularly designed to contain a comparatively shallow volume of fluid for which purpose the peripheral portion of the base 6 is abruptly turned inwardly, as indicated at 9. The walls of the base are then extended inwardly and upwardly, as indicated at 10, providing a comparatively flat coni-form shape, the inwardly sloping walls being merged into the substantially vertical neck section 11, arranged centrally of the container. By this construction the volume of fluid within the base of the container is retained between the bottom 5 and the somewhat closely adjacent upper walls 10 so that its exposure to the refrigerating action of the ice is magnified. The volume of the fluid likewise being comparatively thin, is readily effected by the cooling action, so that the fluid, when charged into the container, and within the surrounding ice-filled chamber of the vessel 2, will rapidly cool.

The diameter of the base or bottom 5 is sufficiently less than the interior diameter of the vessel 2 to provide an annular space 12 completely around the base which permits any melted water to completely surround the base of the container, while the bottom 6 is held sufficiently above the inner face of bottom 8 to provide for a suitable volume of cooling water underneath.

Fluid is drawn from the container 4 or the base thereof from time to time through the faucet 13, rigidly connected by pipe 14 and suitable fixtures with the interior of the vessel, as clearly shown. A similar faucet 15 connects, by pipe 16, with the interior of the ice containing vessel 2 for the purpose of drawing off waste water. Faucet 13 is connected with pipe 14 by a threaded nipple 17 and an intervening packing gasket 18, a similar packing gasket 19 being inserted between the face of the base, preferably in a suitable socket therefor, and providing a tight sealing and cushioning bearing for the enlarged inner head or flange 20 of pipe 14. A tubular section of rubber 21 is also inserted between the outer face of the base 5 and the inner wall of the faucet 2 around pipe 14, providing a cushioning bearing. By this construction the fixture positively connects the fluid container with the ice containing vessel for the purpose of drawing off the contents, at the same time holding the parts in rigid relationship to each other.

Faucet 15 and its pipe 16 and inner terminal connecting nut 22 are at a slightly lower level than faucet 13. The inner end of said connection provides a bearing at the opposite side for the base 5 of the fluid container, assisting in maintaining it in central rigid position.

The neck 11 of the fluid containing vessel is preferably slightly enlarged at a point corresponding to the general level of the sectional cover 3, as indicated at 23, and is provided with an outer annular flange 24 upon which rests the inner edges of the two-part semi-circular cover sections 3, 3. Said cover sections interfit with the upper edge of the ice vessel 2 by means of an inner annular lug 25. By this construction the cover when inserted, fits snugly around the upper portion of the fluid containing vessel and upon the top of the ice vessel.

The outer walls of the fluid container above the bearing ledge 24 are extended for a short distance upwardly therefrom, as indicated at 26, and are then rounded outwardly and upwardly as indicated at 27, forming an enlarged bowl shaped terminal 28. Said portion is preferably provided with a supporting flange 29 having an upwardly turned edge 30 adapted to receive the cover 31 which is preferably provided with a central finger extension 32 for lifting. By reason of the upward extension of the walls 26 and the outer flare thereof, it will be seen that ample space is provided for removal or placement of the cover sections 3, as well as for the insertion of the ice supply. The upper bowl portion 28 is of ample dimensions as to diameter and depth to provide for filling of the container, and largely supplements its capacity.

The opening through the neck section 11 is sufficiently large for the insertion of the hand in fitting the connections for the faucet 13.

The fluid container, like the ice vessel 2, is preferably made of earthenware in a single piece. The outer ice containing vessel is preferably made of vitrified sanitary clay and is thereby of especial advantage in providing a sanitary, easily cleaned, strong and durable construction. Being vitrified, the vessel acts as an insulating covering for the refrigerating contents and is a good non-conductor of heat. The effect of the ice within the container is thus enhanced, effecting great economy of ice. On the other hand the container itself is preferably made of a porous clay, non-vitrified, and a comparatively good heat conductor. The contents of the container are thereby acted upon by the surrounding ice more quickly and thoroughly by the absorption of the heat units, which action is enhanced by the non-conducting character of the outer vessel 2.

The advantages of the construction will be readily appreciated by all those familiar with this class of apparatus. It is comparatively simple and very strong in construction, well adapted to use with buttermilk or other fluids which are desirably kept cool, is easily cleansed, and will constantly maintain a high efficiency of refrigeration.

Having described my invention, what I claim is:

1. The combination with an outer ice-containing vessel, of an inner fluid container consisting of an enlarged spreading base portion contained in the ice vessel and having an integral neck and an upper portion spreading or flaring outwardly from said neck and integral therewith, said upper portion having an opening in its top and extending above the outer vessel.

2. The combination with an outer ice-containing vessel, of an inner open-top integral fluid container consisting of an enlarged spreading base portion contained in the ice vessel and having a neck and an upper portion spreading or flaring outwardly from said neck, and a removable sectional cover for the ice vessel encircling said neck.

3. The combination with an outer ice-containing vessel, of an inner open-top integral fluid container consisting of an enlarged spreading base portion contained in the ice vessel and having a neck provided with an outwardly extending shoulder and an upper portion spreading or flaring outwardly from said neck, and a removable sectional cover for the ice vessel encircling said neck and resting on said shoulder.

In testimony whereof I hereunto affix my signature in the presence of two witnesses.

GEORGE VINEY.

Witnesses:
 C. M. CLARKE,
 THOS. C. PITCAIRN.